3,510,333
PIGMENT PRODUCT
Ely Gonick, Newark, Del., and William J. McGinnis, Waverly, Tenn., assignors to E. I. du Pont de Nemours and Company, Wilmington, Del., a corporation of Delaware
Continuation-in-part of application Ser. No. 347,009, Feb. 24, 1964. This application Oct. 19, 1967, Ser. No. 676,401
Int. Cl. C09c 1/36
U.S. Cl. 106—300  2 Claims

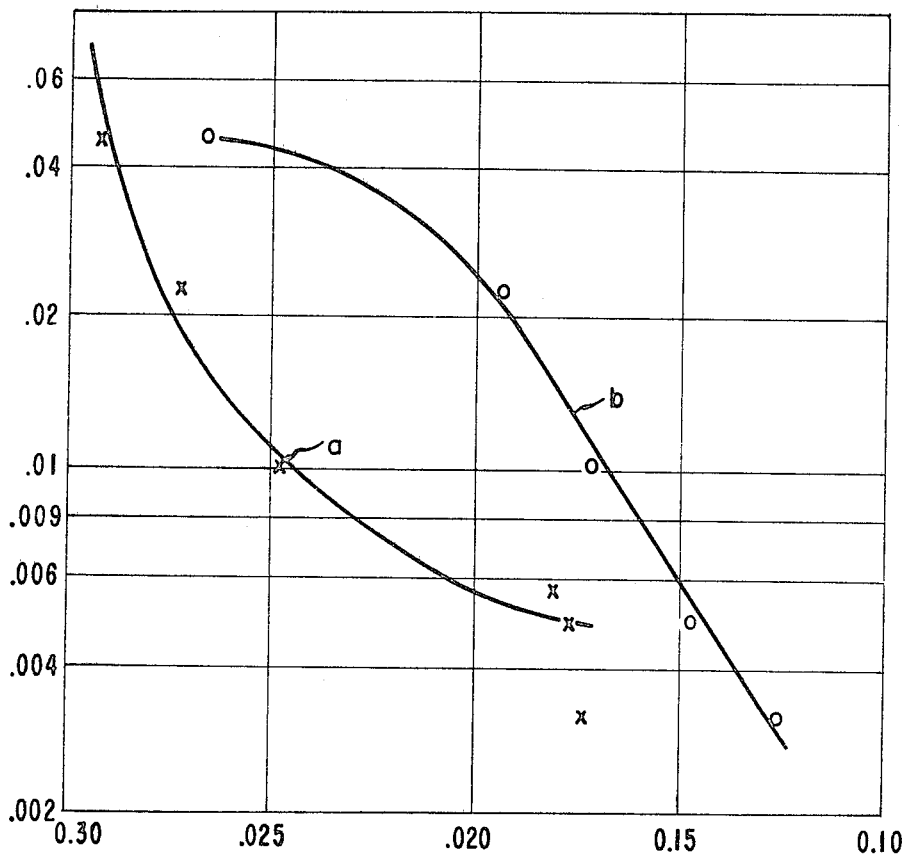

ABSTRACT OF THE DISCLOSURE

A pigment, especially suited for use in paper, of crystalline rutile particles which are at least 95% $TiO_2$ and have a median width of less than 0.2 micron, preferably between 0.15 and 0.19 micron and a median length to width ratio of from 1 to 2, and a light scattering coefficient in 4600 A. blue light at least 1.500 times its light scattering coefficient in 6100 A. red light except that when modified by precipitation thereon of up to 15% of optical modifiers (such as titania, silica or alumina, calculated respectively as $TiO_2$, $SiO_2$ and $Al_2O_3$) the pigment has a light scattering coefficient in 4600 A. light at least (1.500–0.6T) times its light scattering coefficient in 6100 A. light where T is the weight fraction of the optical modifier present.

The pigment is prepared by the very rapid vapor phase oxidation of titanium tetrachloride or by hydrolysis of titanium sulfate solutions employing usually high nucleating conditions followed by the known recovery and calcination steps.

---

This application is a continuation-in-part of co-pending application, Ser. No. 347,000 filed Feb. 24, 1964, now abandoned.

BACKGROUND OF THE INVENTION

Titanium dioxide in substantially pure, white, finely-divided, crystalline state comprises a valuable commercial product useful in various pigment applications. Early $TiO_2$ products were in the anatase crystal structure, while later $TiO_2$ pigments, in the rutile crystalline form provide more efficient hiding power due to the relatively higher refractive index of rutil. When compared to the anatase type, the rutile form, although essentially as bright, exhibits an undesired yellowish appearance, particularly in coating formulations having a flat rather than a glossy appearance. This yellow cast is an inherent characteristic of the rutile crystal due to its greater absorption of incident white light in the blue end of the visible spectrum. As a result of this blue absorption, the reflected light is lacking in blue and hence appears somewhat yellow. In consequence, pigmentary anatase, although less effective in opacity, has been chosen over rutile for use in paper industry applications, both in the paper pulp itself and in paper coatings, which in effect, are relatively highly pigmented systems in which the nature of the spectral reflectance of the pigment is an important factor in the whiteness of the paper product. In the paper industry a requirement of brightness, measured in the blue range which is considered to produce the most desirable appearance, has been adopted the test therefor specifically using light having an effective peak of 4570 A. Prior rutile pigments have exhibited a relatively low reflectance in this light and therefore have not been considered adaptable for use in paper.

High quality rutile pigment has previously been prepared by the vapor phase oxidation of titanium tetrachloride using the basic techniques and improvements typified in the following patents:

(1) U.S. 2,240,343—Muskat—which teaches carrying out the oxidation out of contact with hot reactor surfaces.
(2) U.S. 2,488,439—Schaumann—featuring the addition of water vapor to the reaction zone.
(3) U.S. 2,559,638—Krchma et al.—employing the co-oxidation of $AlCl_3$ with $TiCl_4$ in the presence of water.
(4) U.S. 2,791,490—Willcox—featuring feeding one reactant to the other through a slot in a "sheeted stream."
(5) U.S. 2,915,367—Olson et al.—prevents wall scale by diffusing chlorine in through a porous reactor wall.
(6) U.S. 3,208,866—Lewis et al.—claims the use of alkalinuous metal ion nucleating agents.

In the above prior art the retention period of the reactants and products in the hot reaction zone ranges from .01 to 10.0 seconds, the products having average particle diameters generally greater than 0.2 micron. These products are also well known to exhibit the characteristic rutile yellow shade and hence have not been used extensively in paper.

Good rutile can also be made by the washing, and calcination of the precipitate obtained by thermal hydrolysis of sulfuric acid solutions of ilmenite and the like, provided that the hydrolysis is seeded with up to 10% of colloidal titania such as described in the Olson U.S. Pat. 2,511,218. This pigment has high opacity but is too yellow to meet the requirements of whiteness for use in paper.

SUMMARY OF THE INVENTION

The new pigment of this invention consists of primary particles of crystalline rutile which are at least 95% $TiO_2$ and have particle size characteristics such that not more than 20 wgt. percent of the single particles are above 0.3 micron in width and not more than 10 wgt. percent are less than 0.08 micron in width. Acicular as well as isometric crystals may be present and the average ratio of length to width as observed in the electron microscope range may range from 1 to 2. Preferably, the median length to width ratio for at least 90 wgt. percent of the single particles ranges from 1.25 to 1.8. The particle widths have substantially normal distribution by weight with a median width less than 0.2 micron and preferably between 0.15 and 0.19 micron. Further, this pigmentary rutile exhibits a unique bluish-white appearance which is characterized by an SX ratio of at least 1.50, as hereinafter defined, and preferably between 1.6 and 1.9.

These primary rutile particles may be further improved as to other pigment properties such as durability and opacity by applying to them in known manner up to 15 wgt. percent of precipitated alumina, silica or titania calculated respectively as $Al_2O_3$, $SiO_2$ and $TiO_2$. Silica and alumina are preferred. These precipitates are referred to as optical modifiers and their use bears a relationship to the properties of the product so that its light scattering coefficient in 4600 A. blue light is at least 1.457 times its scattering coefficient in 6100 A. red light but not less than 1.50–0.6T times as great when T is the weight fraction of added optical modifier. This ratio of scattering in the blue light to scattering in the red is preferably in the range of 1.6–0.6T to 1.9 and more preferably 1.6 to 1.8.

These pigments have a unique combination of blue-white appearance competitive with the previously preferred anatase pigments and yet retain the high opacity characteristics of rutile which renders them outstandingly useful, for example, in paper.

The novel primary rutile pigment particles may be prepared by (a) the vapor phase oxidation of titanium tetrachloride wherein the retention period during which the reactants and products are allowed to remain in the reaction zone is controlled to less than about 0.02 second and preferably less than about 0.01 second, the higher periods being permissible only when alkali metal ion as a size controlling device is also used, and (b) the thermal hydrolysis of titanium sulfate solutions using at least 15 wtg. percent of hydrolysis seed (prepared as taught in U.S. Pat. No. 2,511,218). The vapor phase oxidation method is preferred. Retention periods of from about 0.002 to 0.009 second will produce the product of the present invention under usual operating conditions; however, when an alkali metal ion nucleating agent is used, a somewhat longer retention period, i.e., up to about 0.02 second (with 0.1% of the ion agent based on $TiO_2$) may be used.

THE DRAWING

The invention will be more readily understood by reference to the drawing which presents curves wherein particle size in microns, as abscissa, is plotted against reactor retention period in seconds as ordinate. Curve $a$ represents operation in the absence of an alkali metal ion whereas curve $b$ represents operation in the presence of between 100 and 600 p.p.m. of an alkali metal ion.

DEFINITIONS AND TEST METHODS

By the term "reaction zone" as used herein is meant that zone in which the mixed reactants are maintained above their minimum reaction temperature.

The single particles of the pigment of the present invention (as opposed to aggregates and agglomerates) appear, in an electron microscope, as single particles each having a complete visible boundary. Although they look like single crystals, this is not necessarily true but for light in the visible part of the spectrum they are, in effect, single or distinct units. In specifying particle size, therefore, reference is made only to measurements of these single particles as being representative of the whole sample. In observing these particles it will be found that some are nearly cubic or spherical and that some are acicular. Since for obvious reasons width and thickness are difficult to distinguish, width is referred to herein as being the minor dimension as observed in the electron micrograph. In studying the particle size distribution by weight, the base weight is calculated from the known density of rutile and the product of length times the square of the "width." The width dimension is considered to have more bearing on the properties of the final product and hence is preferred as the chief dimensional characteristic.

In preparing the pigment specimen and measuring particle dimensions, the following procedures are used in conjunction with standard electron microscope techniques:

A small quantity, about 1 gram, of pigment is mulled with an equal volume of sodium petroleum sulfonate in a mortar and pestle for 1–2 minutes. The resulting dispersion is diluted with a small quantity of toluene and a fine droplet of this mixture is transferred to a carbon film substrate on an electron microscope specimen screen. The specimen is then washed profusely by rinsing the entire specimen in toluene. Thereafter, it is electron micrographed at 40,000×, using glass plates. For each series of plates, a calibration photo of a replica of 2160 line/mm. grating is taken.

Plates are used directly for observation using Zeiss particle size analyzer. Lengths are measured as longest dimensions; widths are measured at middle of particle.

Sizes are measured on single particles. Twins are not counted. Unless the profile of the particle is clearly apparent, it is ignored (as are those in tightly bound clumps).

In the determination of scattering coefficients of products of this invention, the pigments are incorporated by usual paint laboratory techniques into paints but at a relatively low concentration. Quantities of each pigment, calculated to give a 2% by volume concentration of the pigment in the dried paint film, are ground in a pebble mill for 20 hrs. with similarly calculated amounts of a 60% solids architectural enamel, to which is added 1% by weight of soya lecithin based on the pigment weight. These grinds are then reduced with mineral spirits to 0.308 pound of pigment per gallon of paint, and the resulting paints are used to prepare "drawdowns" over a standard black and white banded hiding power chart. The drawn films, made with a drawdown blade set to give a wet film 3 mils thick, are dried in air in a dust-free cabinet and the scattering power is measured on them. Reflectances, in the two light wave lengths, from these films are then measured, employing a Cary Model 14 Spectrophotometer with an Integrating Sphere for the purpose and two readings over the black bands are averaged for use. One reading over the white band carrying the paint film and one on the white band prior to laying on the paint is made using a magnesium carbonate reference standard in the instrument as a 100% reflectance standard. The measurements in light of wave lengths of 4600 and 6100 A. are recorded and the values of $R_o$ (over black) R (over white) and $R_G$ (over white area of hiding power charts free of added paint) are employed (after correction of the $R_o$ values to correspond to the reflectance values of magnesium carbonate published by Benford, Lloyd and Schwarz in the Journal of the Optical Society of America, vol. 38, pp. 445–447 and shown in the lower curve of FIG. 2) in Kubelka-Monk equations to obtain SX or scattering power of the film in each wave length. These equations, their use and significance are described by Kubelka in the Journal of The Optical Society of America, vol. 38, pp. 448–457 (1948).

The readings obtained from the instrument represent the scattering power of the film shown by the terms SX and S'X for each wavelength, wherein S is the coefficient of scatter for the pigment in the blue light, S' is the coefficient in the red light and X defines the thickness of the film and more particularly the quantity of pigment per unit area. In applying such measurement to the products of this invention, the ratio of these two SX values is employed and measurements in both wave lengths is made on the same film. Therefore, the X values cancel in the ratio:

$$\frac{SX}{S'X} = \frac{S}{S'}$$

and the ratio is in fact the ratio of the coefficient of scatter for the pigment itself in the blue light to that in the red light. The products of this invention exhibit certain critical values for $S/S'$ which, because the actual measurements involve X, is also referred to herein as the SX ratio.

The brightness values are obtained by use of a standard Brightness Tester, previously known as a G.E. Reflectance Meter, obtained from the Institute of Paper Chemists, Appleton, Wis. Various light filters are provided. The brightness values herein reported are obtained with light passing a Wratten Filter No. 49 (Eastman Kodak Co.). This light ranges over the blue end of the visible spectrum with a pronounced peak at 4570 A. This particular light band has been chosen by the paper industry as that which best measures the desirable appearance of the products. Brightness on the pure compressed pigments is measured using the TAPPI Standard Method T651 SM–57. The opacity of the papers is measured in standard known manner using a Bausch and Lomb Opacimeter.

Yellowness is determined with a Hunter Multiple Purpose Reflectometer using standard light filters of amber (A), blue (B), and green (G) color. Reflectance of light passing these filters from the sample is measured and yellowness calculated by the formula $$\frac{A-B}{G}$$

The lower values for this quotient are most desired.

EXAMPLES

The following examples are cited to illustrate the invention. They are not intended to limit it in any manner.

Example 1

A primary base rutile pigment is prepared employing an apparatus and method similar to that described in U.S. Pat. 2,915,367 employing a cylindrical reaction zone. Purified $TiCl_4$ containing 1.2 weight percent of $AlCl_3$ is vaporized, the vapors superheated to a temperature maintained in the 300–500° C. range by passage through a heat exchanger, and is then fed at a rate of 12,000 to 15,000 lbs./hr. through the peripheral slot of the reactor at the mixing zone and into reactive contact with hot oxygen being fed past the slot to the reaction zone. The oxygen reactant is 95% pure (the remainder being chiefly argon) and is preheated to 1400 to 1600° C. Water vapor is introduced into the oxygen stream by spraying in a liquid 0.5 mol percent aqueous solution of KCl, serving as the chief particle size controlling agent, at a rate which supplies 5 lbs. water for each 100 lb. of oxygen. The relative $TiCl_4$ and $O_2$ feed rates are regulated so that some excess above the stoichiometric quantity of oxygen is provided relative to the equation $TiCl_4 + O_2 \rightarrow TiO_2 + 2Cl_2$. The volume of the reaction zone is set at 2.35 cu. ft. by a quenching zone, i.e., a second slot downstream from the mixing zone through which cooled, recycle by-product gases are injected in amounts sufficient to reduce the temperature of the resulting mixture to about 600° C. The procedure limits the retention time in the reaction zone to .0198 second. The effluent gas stream containing fine suspended $TiO_2$ particles is cooled and separated. Electron-microscopy of single particles in a sample of the resulting rutile $TiO_2$ pigment shows a substantially arithmetic normal unimodal size distribution by weight, both with respect to length and thickness, having a median length of 0.24 micron and median thickness of 0.16 micron. 98.0 weight percent of such particles are less than 0.38 in width. Its SX ratio is 1.620 and its excellent whiteness characteristics renders the product useful in papermaking applications.

The main portion of this base pigment is given a (surface) treatment with alumina, titania and silica by the addition of the corresponding reagents during agitation to a 300 g./l. slurry. The slurry is warmed to 60° C., held for 30 min. and the pH adjusted to 1.5 with sulfuric acid. $TiCl_4$ equal to 1.0% by weight of the $TiO_2$ in the slurry is added followed by enough sodium silicate solution containing 200 g./l. $SiO_2$, to provide 2 weight percent $SiO_2$ based on the $TiO_2$ pigment. Enough sodium aluminate to give 4 weight percent $Al_2O_3$ is then added, simultaneously with enough sulfuric acid, to keep the pH below 4.5. The slurry is then neutralized and adjusted to 8.3 pH with 50% NaOH solution and held at 60° C. for 1 hour. After filtration and washing to remove soluble salts, the filter cake is dried and ground in a conventional fluid energy mill.

The resulting product is a high quality pigmentary material especially suited for opacifying paper as shown in Table II below. The original single particle size characteristics of the base $TiO_2$ remains unchanged as a result of surface treating and fluid energy milling, as shown by measurements of electron micrographs in which the surface coating can be distinguished from the inner crystalline particles. X-ray examination of the pigment shows only the rutile structure for the crystalline portion of the $TiO_2$, that present in the coating being amorphous. Its over-all chemical composition is 91.8% crystalline rutile $TiO_2$, 1% acid soluble amorphous $TiO_2$, 2% $SiO_2$, 4.5% acid soluble $Al_2O_3$ and 0.3% insoluble $Al_2O_3$ (derived from the oxidized $AlCl_3$, and about 0.4% $H_2O$). Electron microscopy of this product shows it to consist essentially of the original rutile single particles coated with the added modifier. Its SX ratio is 1.63.

Using the same pigment production technique, but employing a reaction zone of 0.384 cubic feet and 400 parts per million of KCl in the reaction zone, a flow rate providing a reaction zone retention period of 0.009 second produces a finished pigment product having an SX ratio of 1.55, whereas a flow rate providing a retention period of 0.002 second produces a pigment of 1.8 to 1.9 SX ratio in the same zone.

Example 2

The process employed in Example 1 is repeated, except that a cylindrical reaction zone having a volume of 0.128 cubic feet is used to process 4000 lbs. per hour of $TiCl_4$ and alkali metal nucleant addition is omitted. The reactor retention period is 0.003 second. The resulting base pigment particles are characterized by electromicroscopy and determined to be very similar to the product of Example 1 with median width of 0.17 micron and a median length of 0.24 micron. The SX ratio is 1.6. The main portion of this product is given a treatment consisting of alumina and silica, titania being omitted from the treatment. A slurry of the base pigment having a concentration of 400 grams $TiO_2$/liter, is warmed to 60° C. and agitated during the addition of the treating agents. The pH of the slurry is adjusted to 1.5 or below by acid addition. Sufficient sodium silicate solution, containing 200 g./l. $SiO_2$ to provide 2½ weight percent $SiO_2$ based on the $TiO_2$, is then added to the slurry. Thereafter, sufficient sodium aluminate is added to give 5 weight percent $Al_2O_3$ and the slurry pH is permitted to become alkaline. It is then neutralized and adjusted to a pH of 6.5 by hydrochloric acid addition and the slurry is held at 60° C. for 1 hour. It is then filtered and the pigment is washed to remove soluble salts. The recovered filter cake is dried and then ground by passage through a fluid energy mill. The product consists of a high quality pigmentary material particularly suited for use in opacifying paper. It has an SX ratio of 1.6.

In Examples 3 to 8 which follow, a series of comparative runs are made to illustrate the effect of the use of an alkali metal nucleating ion on the retention period limits in producing the pigment of the present invention. The pigment producing techniques of Examples 1 and 2 are followed. Columns "A" and "B" record median particle widths in microns, the products of column "A" having been formed in the absence of a nucleating ion whereas the products of column "B" are formed in the presence of 400 to 600 parts per million of potassium chloride.

TABLE I

| Ex. | Reactor vol. (cu. ft.) | Feed rate (lbs./hr.) | Pressure (lbs. gage) | Retention period (secs.) | A | B |
|---|---|---|---|---|---|---|
| 3 | 2.35 | 5,000 | 25 | 0.045 | *0.289 | *0.263 |
| 4 | 2.35 | 15,000 | 18 | 0.022 | *0.270 | 0.195 |
| 5 | 2.35 | 21,000 | 11 | 0.010 | *0.250 | 0.165 |
| 6 | .128 | 3,000 | 25 | 0.006 | 0.180 | |
| 7 | .70 | 13,000 | 7 | 0.004 | 0.174 | 0.148 |
| 8 | .128 | 6,000 | 25 | 0.003 | 0.174 | 0.120 |

* SX < 1.3; remaining SX ratios from 1.5 to 1.8.

From the above, and as represented graphically in FIGURE I, it will be apparent that the pigment of the present invention, i.e., wherein particle size widths are no greater than 0.20 micron can be formed with a retention period as long as 0.02 second when a nucleating alkali metal ion is present; in the absence of a nucleating ion, the retention period of the reactants in the reaction zone must be maintained below about 0.01 second.

The sulfate process may also be employed to make the pigment of the present invention as demonstrated in the following example.

Example 9

A solution of ilmenite in sulfuric acid containing 240 g./l. $TiO_2$ is seeded with 15% of a nucleating hydrous titania prepared according to U.S. Pat. 2,511,218. The resulting mixture containing 175 g. $TiO_2$ per liter is heated gradually to boiling and boiled 3 hours. The resulting hydrolysate is filtered, acid rinsed, washed, and treated in the wet state with 5% of a mixture of sodium and potassium sulfate. A portion is calcined in air at 900° C., wet ball-milled, dried, and micropulverized. The product is a very fine pigment, acicular in nature and having an SX ratio of 1.66.

Similar preparations with 10–12% seed have SX ratios of 1.4 or less.

The modified rutile pigment of this invention must exhibit, as already noted, an optimum balance of two properties, namely, a freedom from the undesirable yellow shade characterizing prior rutile pigments, and at the same time a degree of opacifying or hiding power which advantageously renders it competitive in this respect, as well as economically, with prior anatase products employed in papermaking. These properties have been developed in and are characteristic of the novel pigment of this invention to render it outstandingly advantageous for use in paper and paper coating composition applications, as will be evident from the following evaluations conducted against various $TiO_2$ pigments in paper use applications.

EVALUATION IN PAPER

In evaluating the pigment of the present invention for use as a component in paper manufacture, long fiber bleached sulfite pulp is used in comparative tests, with a pigment similar to that of Example 1 having a scattering ratio of 1.6, a mean particle width of 0.17 micron modified with 1% $TiO_2$, 2% $SiO_2$ and 4% $Al_2O_3$, against commercial anatase $TiO_2$ pigment. The paper pulp is prepared in a laboratory beater, with varying amounts of the pigments being added to portions of the pulp during agitation. After mixing the pulp and pigment, a paper product is prepared from the mixture on a conventional laboratory sheet machine, using standard papermaking procedures to obtain paper of 50 lbs. per TAPPI ream. The comparison is made between an experimental $TiO_2$ pigment product and commercial anatase in terms of quantity of pigment, brightness and opacity of both the waxed and unwaxed papers produced.

TABLE II

|  | Prior art anatase | Rutile product of the invention (prepared as in Ex. 1) | | | |
|---|---|---|---|---|---|
| Pigment sample: |  |  |  |  |  |
| Percent pigment in paper | 4 | 4 | 3.2 | 2.9 | 2.6 |
| Rel. amt. pigment | 100 | 100 | 80 | 72.5 | 65 |
| Brightness: |  |  |  |  |  |
| Unwaxed | 90.5 | 91.6 | 90.8 | 90.7 | 90.5 |
| Waxed | 80.9 | 82.5 | 81.6 | 81.2 | 80.8 |
| Opacity: |  |  |  |  |  |
| Unwaxed | 84.2 | 85.3 | 85.0 | 84.4 | 83.4 |
| Waxed | 60.0 | 65.0 | 62.7 | 61.2 | 59.6 |

The data in Table II clearly show the superior quality of the rutile pigment of this invention, both in respect to the critical blue-white brightness measured in the 4570 A. light and in opacity. The high efficiency of this rutile pigment in such properties is clearly evident from the high values obtained even when the amount present is as low as 65% of the amount of prior art anatase used. This comparison, coupled with the fact that the over-all brightness of the novel rutile is fully equal to other pigments in this use classification, demonstrates the clear advantages flowing from use of the new pigment in papermaking applications.

EVALUATION IN PAPER COATING

In evaluating the pigment of the present invention as a paper coating constituent, several pigments of the present invention are compared with prior art anatase and rutile pigments designed for paper coating use. The coatings employed are formulated by using 80% clay, 20% $TiO_2$ and an acrylic-alpha protein binder. The results of the comparisons are given in the following Table III.

TABLE III

| Pigment | Prior art rutile | Prior art anatase | Rutile $TiO_2$ of this invention | | | | |
|---|---|---|---|---|---|---|---|
| Treatment | 1-2-4 | 0-0-3 | 1-2-4 | 1-2-4 | 1-2-4 | 0-2-4 | None |
| SX ratio | 1.320 | 1.525 | 1.565 | 1.46 | 1.528 | 1.550 | 1.527 |
| Brightness: |  |  |  |  |  |  |  |
| Bleached board | 86.7 | 85.8 | 87.8 | 87.7 | 87.9 | 87.5 |  |
| Kraft board | 78.8 | 77.6 | 80.5 | 80.7 | 80.8 | 79.5 |  |
| Food wrap: |  |  |  |  |  |  |  |
| Unwaxed | 83.9 | 83.1 | 84.4 | 84.2 | 84.3 | 84.2 | 84 |
| Waxed | 71.4 | 69.9 | 72.7 | 72.2 | 72.7 | 72.4 | 72.5 |
| Pigment alone | 98.3 | 96.6 | 97.7 | 99.3 | 99.0 | 99.1 | 98.6 |
| Opacity: |  |  |  |  |  |  |  |
| Unwaxed | 85.2 | 84.3 | 85.1 | 84.8 | 84.8 | 85.0 | 84.5 |
| Waxed | 64.5 | 61.8 | 65.1 | 64.4 | 64.8 | 65.0 | 65.6 |
| A−B/G | .082 | .077 | .068 | .069 | .068 | .073 |  |

The "treatment" values given represent the amount of oxide treatment, if any, applied in each instance to the particular $TiO_2$ pigment. Thus, the first numeral designates the percent by weight, based on the dry product, of $TiO_2$ added; the second number the percent $SiO_2$ used; while the third number represents the amount of $Al_2O_3$ incorporated, e.g., "1–2–4" under prior art rutile means that 1% $TiO_2$, 2% $SiO_2$ and 4% $Al_2O_3$ were present as additions. On the other hand, "0–0–3" under prior art anatase means 3% of $Al_2O_3$ only was present as an additive.

It should be noted that while the above values seem to show quite small differences of about 1 to 2%, these are significant and show a marked advance in the appearance obtained. The actual visual comparison of these paper products shows that outstanding improvements are obtained by the new pigments.

The efficiency and advantages afforded from use of the present rutile product in coatings is further demonstrated on repeating the tests referred to in Table III but employing only 16% of such product as compared to 20% of prior art anatase paper pigment. This comparison is shown in Table IV below, wherein the various values given for the present products are either substantially the same or better than for anatase. The economic advantage afforded is clearly demonstrated from the fact that at least as good a result is obtained with a 20% reduction in $TiO_2$ required, whereas the cost differential is only about 8%.

TABL IV

| Pigment | Anatase | Prior art anatase | Rutile | Rutile $TiO_2$ of this invention | | | |
|---|---|---|---|---|---|---|---|
| Treatment |  | 0-0-3 |  | 1-2-4 | 1-2-4 | 1-2-4 | 0-2-4 |
| SX ratio |  | 1.525 | 1.32 | 1.565 | 1.46 | 1.528 | 1.55 |
| Brightness: |  |  |  |  |  |  |  |
| Bleached board | 87.0 | 86.0 | 85.8 | 87.2 | 86.7 | 86.7 | 86.5 |
| Kraft band | 80.2 | 78.3 | 78.6 | 80.0 | 79.6 | 79.9 | 79.5 |
| Food wrap: |  |  |  |  |  |  |  |
| Unwaxed | 83.6 | 83.7 | 83.5 | 84.2 | 83.7 | 83.8 | 83.8 |
| Waxed | 70.7 | 70.2 | 70.2 | 71.8 | 71.1 | 71.3 | 71.2 |
| Opacity: |  |  |  |  |  |  |  |
| Unwaxed | 84.0 | 84.0 | 84.0 | 84.2 | 84.1 | 84.2 | 84.1 |
| Waxed | 61.6 | 61.3 | 62.4 | 62.7 | 62.5 | 62.8 | 62.7 |
| Amount pigment used, percent | 20 | 20 | 16 | 16 | 16 | 16 | 16 |

REACTION CONDITIONS

As demonstrated in the examples, the retention period of the reactants in the reaction zone, i.e., the zone in which the mixed reactants are maintained above their reaction temperature must be carefully controlled to produce the pigments of the present invention. The reaction temperature will vary depending upon the nature of the reactants. Thus, when air and $TiCl_4$ are mixed to form a reacting mixture, the minimum temperature to initiate reaction is about 950° C., whereas when pure oxygen is used instead of air, the reaction initiation temperature is about 700° C. Because the reaction is exothermic and in order to produce well developed rutile crystal structure, the normal operating temperature in the reaction zone is considerably higher. Thus, in the process of the invention the reaction mixture is passed through a hot zone into a cooler zone at a rate which provides the required short retention period at a temperature above the minimum reaction temperature for the system in use. Rapid cooling is preferred and may be accomplished by passing the reaction products immediately to a pipe or conduit having cooled walls or by quenching by rapid mixing with a suitable cold gas, e.g., by-product chlorine as described in U.S. Pat. 2,508,272. The quenching of the reactants with a liquid, e.g., water is also suitable. Although the use of water vapor, alkali metal ions, and co-oxidation of $AlCl_3$ are known devices for bringing the particle size of rutile made by the oxidation of $TiCl_4$ down into the pigmentary range, i.e., about 0.2 to 0.25 micron, retention period control as taught herein is necessary to obtain the novel products of the present invention. In mixing the reactants, it is preferred to use the peripheral slot method of Willcox, U.S. 2,791,490 to insure the complete oxidation of the $TiCl_4$ to $TiO_2$.

PRODUCT COMPOSITION

The chemical composition of the primary or base rutile will depend somewhat on the process selected for its production. In general, the single rutile particles must contain at least 95% $TiO_2$ on an anhydrous basis, and preferably are 98% $TiO_2$ or purer. Any diluting substances present should be essentially white or colorless and must not be present in such quantity as will degrade the rutile lattice structure to a point where its refractive index is effectively lessened. $TiO_2$ products from the oxidation process are usually very pure, e.g., will be at least about 96% $TiO_2$ and in the rutile structure. In the preferred practice, products from the cooxidation will contain up to about 3% of $Al_2O_3$ and perhaps, similarly, some $SiO_2$. Very minor amounts of the alkalinous size controlling agents and trace impurities may be present totalling not over 0.3% by weight. The rutile pigment obtained on calcining the hycrolysate from an aqueous solution of titanium sulfate or chloride salts can be washed, if desired, to decrease its soluble salt content to the desired extent. Also, such aqueous neutralizing and filtration steps as may be desired can be applied to the product from the oxidation of $TiCl_4$ to effect removal of adsorbed chlorine or $TiCl_4$ and titanium oxychlorides.

The particles of the rutile pigment of this invention can be characterized as those having substantially normal distribution by weight of the single particle widths, with a median width of less than 0.20 micron and preferably between 0.15 and 0.19 micron.

AFTER-TREATMENTS

The optimum improved rutile pigment of this invention having the specified particulate properties mentioned is one which has been given a specific treatment to further enhance its opacifying power. This is best effected while the primary rutile pigment is suspended in aqueous slurry at concentrations ranging from 100 to 600 grams per liter. Such concentration is not critical. If desired, higher concentrations can be used, so long as good mixing of the pigment and the added modifying materials is had. Deposition of the optical modifier on the base pigment in the slurry can be brought about by adding a salt or other water soluble compound of silicon, aluminum or titanium to the slurry and adjusting the pH in the slurry through neutralization to precipitate the desired quantity of alumina, silica or titania in hydrous oxide form to coat the base pigment particles. Preferably, this treatment is carried out at an elevated temperature, e.g., from 50 to 100° C. Following compound addition, the treated slurry is finally adjusted to a pH of between 6 and 9, and preferably between 7.5 and 8.3, with use of such common acidic reagents as hydrochloric or sulfuric acid, or basic compounds as sodium hydroxide or ammonia. Thereafter, the slurry is filtered, the pigment cake is washed, if desired, to remove soluble salts and is then dried. It will usually be found advantageous to subject the product to dry milling treatment to break up undesired aggregates or agglomerates.

Generally, such modifier treatment involves the deposition of a relatively small amount, from about 1% up to about a total of 15% by weight, of the three hydrous oxides calculated as $Al_2O_3$, $SiO_2$ and $TiO_2$ based on the rutile content of the composite product. The deposited material is found to be present for the most part as a coating on each base pigment particle. Alumina and silica are preferred and usually work best in combination. Typical treatment quantities are in the following ranges.

|  | General | Preferred |
| --- | --- | --- |
| $Al_2O_3$ | 0–15 | 4–6 |
| $SiO_2$ | 0–10 | 1–3 |
| $TiO_2$ | 0–2 | 0–2 |

The improved rutile pigments of the present invention are useful in pigmenting cellulosic paper and coating compositions therefor, even when blended with other pigmentary substances, or with extender materials. Thus, the pigment may be blended with four times its weight of clay or blended with anatase pigment with resulting accruing benefits proportionate to the amount employed. Sometimes the base product obtained from the precipitation of $TiO_2$ may contain as much as 20% anatase, but if the rutile portion of the composite is controlled to provide the fundamental characteristics herein required, the corresponding benefits will be found to be obtained. In this context, it may be said that this invention pertains solely to the rutile pigmentary material present.

Many equivalent modifications will become apparent to those skilled in the art from a reading of the above without a departure from the inventive concept.

What is claimed is:

1. A rutile $TiO_2$ opacifying pigment of improved whiteness for paper and paper coating applications, comprising a primary particulate substance consisting essentially of crystalline rutile, the single particles of which are at least 95 weight percent $TiO_2$ with not more than 20 weight percent thereof being above 0.3 micron in width and not more than 10 weight percent of such particles being less than .08 micron in width, and with a median length to width ratio of 1.25 to 1.8, and containing as a precipitated coating 1 to 15%, based on said rutile, of at least two oxidic optical modifiers selected from the group consisting of alumina, silica and titania, calculated at $Al_2O_3$, $SiO_2$, and $TiO_2$, respectively, said pigment having a light scattering coefficient in 4600 A. blue light which is at least 1.6 to 1.9 times the light scattering coefficient in 6100 A. red light.

2. A rutile $TiO_2$ opacifying pigment of improved whiteness for paper and paper coating application, comprising a primary particulate substance consisting essentially of crystalline rutile, the single particles of which are at least 95 weight percent $TiO_2$ with a median width of from 0.15 to 0.19 micron and a median length to width ratio of 1.25 to 1.8, said pigment containing a precipitated coating as an optical modifier therefor, based on said rutile, of from 4.0 to 6.0% alumina, as $Al_2O_3$, and from 1 to 3% silica, as $SiO_2$, said pigment having a light scattering coefficient in 4600 A. blue light which is at least 1.6 to 1.9 times the light scattering coefficient in 6100 A. red light.

References Cited

UNITED STATES PATENTS

| | | | |
|---|---|---|---|
| 2,488,439 | 11/1949 | Schaumann | 106—300 |
| 2,511,218 | 6/1950 | Olson et al. | |
| 2,559,638 | 7/1951 | Krchma et al. | |
| 2,671,031 | 3/1954 | Whately | 106—300 |
| 2,791,490 | 5/1957 | Willcox. | |
| 2,915,367 | 12/1959 | Olson et al. | |
| 3,035,966 | 5/1962 | Siuta | 106—300 |
| 3,208,866 | 9/1965 | Lewis et al. | 106—300 |
| 3,220,867 | 11/1965 | O'Shaughnessy | 106—300 |
| 3,251,705 | 5/1966 | Rieck et al. | 106—300 |

TOBIAS E. LEVOW, Primary Examiner

H. M. S. SNEED, Assistant Examiner

U.S. Cl. X.R.

106—137, 308; 162—181